Patented Apr. 2, 1929.

1,707,809

UNITED STATES PATENT OFFICE.

LESTER KIRSCHBRAUN, OF CHICAGO, ILLINOIS.

EMULSION AND PROCESS OF MAKING THE SAME.

No Drawing.    Application filed January 17, 1921.    Serial No. 438,051.

This invention relates to improvements in a process for forming emulsions and relates more particularly to an emulsion in which the dispersed particles are supplied with an additional enveloping film or coating which materially increases its non-adhesive properties.

An object of the invention claimed herein is to first effect the emulsification of the bitumen with an emulsifying agent in suitable quantities for that purpose and in thereafter adding to the emulsion thus formed agents capable of chemical reaction to produce, in situ, a protective coating to stabilize the system, the material added having substantially no emulsive functions.

Among its salient objects are to provide an emulsion of bituminous, pitchy or other analogous waterproofing substances combined with a suitable emulsifying and protecting agent; to provide a process which has for its object the coating of asphalt in dispersed condition with an additional protective film besides that supplied by the emulsifying agent; to provide a process of making an emulsion in which particles of asphalt, which are dispersed in water with an emulsifying agent as clay, are subjected to the action of an enveloping medium which adds to the non-adhesive properties of the dispersed asphalt; to provide a process in which the enveloping or protecting substances is of a non-adhesive character and is firmly attached or attracted to the dispersed asphalt so that it is not readily removed therefrom; to provide a coating about dispersed asphalt particles such that when combined with fibrous material and formed into a web on a paper machine the protecting substances will be so permanent in character and resistant to displacement as to substantially increase the ability of the dispersed asphalt particles to resist pressure of press rolls and adhesion to wires and blankets used on paper forming machinery; and, in general, to provide a process in which emulsified asphalt or like bituminous waterproofing substances are protected by enveloping films of a third substance insoluble in the aqueous liquid.

In a previous application, Ser. No. 26,813 filed May 8, 1915, now Patent 1,302,810, I have described a process of making an asphalt emulsion and in a succeeding application Ser. No. 274,497, filed February 1, 1919, a process is described of producing this emulsion continuously. The present invention has to do with improvements in the above processes and uses as its basic materials the ingredients and methods set forth in the previous applications.

In producing the emulsion of the present invention upon a commercial scale it is preferable to manufacture it in a continuous manner. In producing this emulsion, a mixture is first made of water and colloidal clay. These are thoroughly stirred together until a smooth creamy liquid is produced, which is sufficiently thin to be handled by pumps and to flow readily yet containing sufficient clay of a colloidal character so that it has considerable body when rubbed between the fingers. This property possessed by clays, which produces body or viscosity when in aqueous suspension is thought to be due to the colloidal material which is present and in carrying out this invention it is necessary to secure clay which possesses these properties to the highest degree. Such clay will produce an emulsion of highest degree of dispersion and may be used in much less quantity than inferior clays which possess plasticity or viscosity to a lower degree.

The proportions of clay and water will vary considerably with the colloidal properties of the clay and with the proportions of clay and asphalt which are desired in the finished emulsion.

The asphalt or bituminous material, which it is desired to emulsify, is melted in a kettle and brought to a suitable temperature for the operation, which is generally in the neighborhood of 300–375° F., according to the character of the asphalt. The melting point of the asphalt, for example, will largely govern the temperature required to produce a degree of fluidity desirable for rapid emulsification and fine dispersion.

In producing the product of the present invention, the insulating or protecting substance may be added to the clay or may be added to the emulsion after this is complete. When added to the clay, it is incorporated into the aqueous solution, which is thoroughly agitated so that the protecting medium is uniformly distributed throughout.

When the emulsion is made as a continuous operation, the mixer is first charged with a relatively thick mixture of the combination aforedescribed. The mixer is provided with suitable agitating paddles, which are caused to revolve rapidly and the contents are brought to a suitable temperature for producing the emulsion, which may be around 130° F. Asphalt in molten liquid condition is now pumped into the mixer and through the rapid agitation of the blades and the circulation therein an emulsion is produced in which the asphalt particles become finely dispersed throughout the emulsifying mixture. As the asphalt is flowed into the mixer and becomes emulsified, a portion of the contents of the mixer is continuously withdrawn. When the proper proportion of asphalt to emulsifying agent is present in the mixer, which will be determined by color of the emulsion or by metering devices used, the aqueous suspension of the emulsifying agent previously described is then fed into the mixer in proper proportions simultaneously with the hot asphalt in separate streams. Of course, in practical operation, the mixer is always left charged with emulsion previously made so that in resuming the emulsifying operation it it not necessary to charge the mixer with thick emulsifying medium as for an initial emulsion. The previously produced emulsion in such case forms the bulk supply or starting material for the continuous operation.

The operation is continued, a regulated portion of the contents of the mixer being continuously withdrawn as asphalt and aqueous emulsifying liquid are supplied in the proper proportion.

The emulsion so produced has the appearance of a thick mud which, when worked between the fingers or subjected to manual manipulation, feels exceedingly smooth and slippery. Its ability to withstand attrition and pressure between the fingers without adhering thereto is roughly a measure of its non-adhesive properties. As the emulsion in thick form is discharged from the mixer, it may be diluted with water and conducted to proper storage tanks whence it may be withdrawn for admixture with fibrous stock for use in paper making or for other purposes.

I have described a method of incorporating a protecting agent with clay colloid prior to producing the emulsion. A similar result, however, may be obtained by adding the protective agent to the emulsion after the emulsion has been made. As an example of a substance which tends to form a protective coating about the particles of asphalt in the emulsion, I may mention talc or other substances of a like nature, which, when used with the water and clay emulsifying liquid, give the insulating bodies or plates about the asphaltic particles greater ability to afford increased protection against adhesion and coalescence. It will be understood, of course, that the clay used as an emulsifying agent has the property of becoming more or less adsorbed by the dispersed particles of asphalt so that in themselves they act as a protecting agent. The introduction, however, of a third substance, such as described, has a tendency to greatly reinforce this protecting action and thereby to render the emulsion so produced more resistant to any tendency toward adhesiveness. The effect of the additional protecting agent, when viewed under a microscope, is to increase the concentration of the protecting or insulating particles clustered about the dispersed asphalt. The use of malachite green in viewing specimens of the emulsion assists greatly in observation of the configuration of the insulating particles with respect to the asphalt.

I have cited an example of a protecting agent such as talc (hydromagnesium silicate), but various other materials can be used. In fact, it is not necessary that the protecting agent be added as such but it may be produced as the result of reaction from added substances either during or after the process of emulsification takes place. It will be understood, however, that neither the clay nor the asphalt will take part in such reaction but the additional protecting substances so produced will result from the combination of suitable ingredients added either during or after the emulsification. For example, after the emulsion is made, sodium sulphite may be added thereto and after its thorough incorporation a soluble metallic salt, such as zinc sulphate, may be added, which will produce an insoluble basic zinc sulphate about the asphaltic particles in the aqueous medium. Or, the emulsion may be mixed with metallic salts to which is later added suitable alkali to produce the protecting substance desired. The protective coating is therefore produced in situ.

The making the emulsion previously described, I have used colloidal clay as an emulsifying agent, but I do not wish to be limited to the treatment of emulsions made with colloidal clay as this process may be adapted to insulate and protect particles of adhesive waterproofing material brought into a state of dispersion by other emulsifying agents than colloidal clay.

In the producing of this additional film, I have not been able to ascertain all substances which will give additional protective properties to the dispersed particles of asphalt contained in the emulsion but no doubt there are numerous other substances which will serve this purpose. Also, I do not wish to limit myself to the emulsification of strictly bituminous substances, but wish to include all resinous, pitchy or other waterproofing materials particularly such as are generally of an adhesive character.

By the term "bituminous" as used in the claims, I intend to include all of the materials set forth in the specification including bitumens such as asphalt, and all resinous, pitchy or other waterproofing materials, particularly those that are generally of an adhesive character.

I claim as my invention:

1. The improvement in the art of emulsification, which consists in first emulsifying bituminous particles, normally non-liquid at atmospheric temperatures, with an emulsifying agent in a fluid vehicle, the emulsifying agent being present in quantities sufficient to effect the emulsification of the bituminous particles and thereafter forming, by chemical reaction in situ, a protective coating for surrounding and insulating the bituminous particles, without changing the particle size of the initially emulsified bituminous particles.

2. In a process of increasing the stability of bituminous emulsions comprising bitumen, a fluid vehicle and an emulsifying agent in a quantity sufficient to effect emulsification of the bitumen, the improvement which consists in adding to the emulsion after its formation soluble salts, forming by chemical reaction in situ, a protective coating for the emulsified particles without tending to change the particle size of the initially dispersed bituminous particles.

3. A stabilized bituminous emulsion comprising bituminous particles normally non-liquid at atmospheric temperatures, an emulsifying agent and a fluid vehicle, the emulsifying agent being present in sufficient quantities to effect emulsification of the bituminous particles, the emulsion having incorporated therein a reaction product constituting a protective coating for the bituminous particles, said protective coating being characterized by having been produced by chemical reaction in situ, without substantially changing the particle size of the bituminous particles of the initially formed emulsion.

LESTER KIRSCHBRAUN.